(12) United States Patent
Bracha

(10) Patent No.: US 9,398,550 B2
(45) Date of Patent: Jul. 19, 2016

(54) USING SYNCHRONIZATION FRAMES FOR MESH NETWORKING WITH PICONETS

(71) Applicant: QUALCOMM Incorporated, San Diego, CA (US)

(72) Inventor: Vered Bar Bracha, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 13/662,817

(22) Filed: Oct. 29, 2012

(65) Prior Publication Data

US 2013/0051381 A1 Feb. 28, 2013

Related U.S. Application Data

(62) Division of application No. 12/573,559, filed on Oct. 5, 2009.

(60) Provisional application No. 61/113,436, filed on Nov. 11, 2008.

(51) Int. Cl.
| | |
|---|---|
| *H04W 4/00* | (2009.01) |
| *H04W 56/00* | (2009.01) |
| *H04W 72/12* | (2009.01) |
| *H04W 84/18* | (2009.01) |
| *H04W 24/00* | (2009.01) |
| *H04W 72/08* | (2009.01) |

(52) U.S. Cl.
CPC .......... *H04W 56/00* (2013.01); *H04W 72/1215* (2013.01); *H04W 84/18* (2013.01); *H04W 24/00* (2013.01); *H04W 72/082* (2013.01)

(58) Field of Classification Search
CPC .............................. H04W 28/20; H04W 56/00
USPC ................................... 370/208–339; 455/550
See application file for complete search history.

(56) References Cited

U.S. PATENT DOCUMENTS

| | | |
|---|---|---|
| 5,945,949 A | 8/1999 | Yun |
| 8,340,116 B2 | 12/2012 | Huang et al. |
| 8,351,980 B2 * | 1/2013 | Wakefield .......... G08B 13/1427 340/426.1 |
| 2002/0075941 A1 | 6/2002 | Souissi et al. |
| 2003/0112878 A1 | 6/2003 | Kloper |
| 2004/0053621 A1 | 3/2004 | Sugaya |
| 2004/0170121 A1 * | 9/2004 | Kim et al. ..................... 370/208 |

(Continued)

FOREIGN PATENT DOCUMENTS

| | | | |
|---|---|---|---|
| JP | 2005094749 A | 4/2005 | |
| JP | 2005286866 A | 10/2005 | |

(Continued)

OTHER PUBLICATIONS

European Search Report—EP12001578—Search Authority—Hague—Nov. 26, 2012.
International Preliminary Report on Patentability—PCT/US2009/064050, The International Bureau of WIPO—Geneva, Switzerland, Feb. 22, 2011.

(Continued)

*Primary Examiner* — Iqbal Zaidi
(74) *Attorney, Agent, or Firm* — Steven R. Thiel

(57) ABSTRACT

Certain aspects provide a technique for managing transmissions in a wireless network. The technique generally provides for an access terminal to transmit synchronization packets containing timing information regarding an existing piconet. The synchronization packets may contain an indication of resources of the piconet allocated to the access terminal by an access point.

11 Claims, 15 Drawing Sheets

(56) References Cited

U.S. PATENT DOCUMENTS

| | | | |
|---|---|---|---|
| 2005/0090200 A1 | 4/2005 | Karaoguz et al. | |
| 2005/0122944 A1 | 6/2005 | Kwon et al. | |
| 2006/0067280 A1 | 3/2006 | Howard et al. | |
| 2006/0072627 A1* | 4/2006 | Kugumiya et al. | 370/503 |
| 2006/0133320 A1 | 6/2006 | Kim et al. | |
| 2006/0203850 A1 | 9/2006 | Johnson et al. | |
| 2006/0240777 A1* | 10/2006 | Ruuska | H04W 16/14 455/41.2 |
| 2007/0071030 A1 | 3/2007 | Lee | |
| 2008/0013613 A1 | 1/2008 | Ahmad et al. | |
| 2010/0066804 A1* | 3/2010 | Shoemake et al. | 348/14.02 |
| 2010/0118837 A1* | 5/2010 | Bracha | 370/336 |

FOREIGN PATENT DOCUMENTS

| | | |
|---|---|---|
| JP | 2005537692 A | 12/2005 |
| JP | 2006173891 A | 6/2006 |
| JP | 2006311172 A | 11/2006 |
| WO | WO2006117644 | 11/2006 |
| WO | WO2007121414 | 10/2007 |

OTHER PUBLICATIONS

International Search Report—PCT/US2009/064050—International Search Authority, European Patent Office, Aug. 30, 2010.

Written Opinion—PCT/US2009/064050, International Search Authority, European Patent Office, Dec. 16, 2010.

* cited by examiner

USING SYNCHRONIZATION FRAMES FOR MESH NETWORKING WITH PICONETS

CROSS-REFERENCE TO RELATED APPLICATION

This application is a Divisional of U.S. patent application Ser. No. 12/573,559 entitled "USING SYNCHRONIZATION FRAMES FOR MESH NETWORKING WITH PICONETS," filed Oct. 5, 2009, which claims benefit of U.S. Provisional Patent Application Ser. No. 61/113,436 filed Nov. 11, 2008, which is herein incorporated by reference in its entirety.

BACKGROUND

1. Field

The invention relates generally to wireless communication and, more particularly, to wireless networks, such as local area networks (LANs) and personal area networks (PANs) commonly referred to as piconets.

2. Background

A "piconet" is generally defined as a wireless personal area network that is composed of a group of wireless devices such as an "access terminal," an "access point" or both such devices in close proximity to one another. A piconet is typically controlled by an access point that assumes the role of a Piconet Coordinator (PNC) that acts as a master terminal that schedules access to the communications medium for the other access terminals in its piconet. Frames are the basic unit of data transport in a piconet, which can include data, acknowledgment, beacon and MAC command frames.

A PNC may also define a superframe structure consisting of multiple frames, with beacons acting as boundaries and providing synchronization to other devices. The IEEE 802.15.3 standard specifies that the PNC sends a beacon to synchronize data exchanges between the PNC and the terminals in the piconet. The beacon signals a start of a superframe and allows each terminal to reset its superframe clock to zero at the beginning of a beacon preamble.

Certain drafts of the IEEE 802.15.3 standard mandate that all PNC capable devices, when operating as PNC, shall transmit common rate beacon in every superframe and that all PNC capable devices shall be able to receive the common rate beacon and command frames. This mechanism is designed to allow PNC capable devices to become aware of existing piconets, which will allow them to join and, more importantly, prevent them from forming independent piconets that may cause interference to devices that are in range of both piconets.

Unfortunately, a PNC capable device within range of some devices of an existing piconet may not be in range of the piconet's PNC. As a result, such a device (which may be referred to as a "hidden node") may not detect the beacon preventing it from joining the existing piconet. Even more problematic, the hidden node may form an independent piconet and cause interference to devices that are in range of both piconets.

SUMMARY

Certain aspects of the present disclosure provide a method of wireless communication. The method generally includes receiving, from a first node in a first piconet, a first synchronization packet containing timing information regarding allocation of resources in the first piconet, determining interference time slots corresponding to allocated transmissions times for nodes in the first piconet, based on the timing information, and establishing a second piconet by allocating available resources to nodes in the second piconet based on the determined interference time slots corresponding to allocated transmissions times for the nodes in the first piconet.

Certain aspects of the present disclosure provide an apparatus for wireless communication. The apparatus generally includes a receiver configured to receive, from a first node in a first piconet, a first synchronization packet containing timing information regarding allocation of resources in the first piconet, a scheduler configured to determining interference time slots corresponding to allocated transmissions times for nodes in the first piconet, based on the timing information, and logic configured to establish a second piconet by allocating available resources to nodes in the second piconet based on the determined interference time slots corresponding to allocated transmissions times for the nodes in the first piconet.

Certain aspects of the present disclosure provide an apparatus for wireless communication. The apparatus generally includes means for receiving, from a first node in a first piconet, a first synchronization packet containing timing information regarding allocation of resources in the first piconet, means for determining interference time slots corresponding to allocated transmissions times for nodes in the first piconet, based on the timing information, and means for establishing a second piconet by allocating available resources to nodes in the second piconet based on the determined interference time slots corresponding to allocated transmissions times for the nodes in the first piconet.

Certain aspects of the present disclosure provide a wireless node capable of assuming a role of a Piconet Coordinator (PNC). The wireless node generally includes at least one antenna, a receiver configured to receive via the at least one antenna, from a first node in a first piconet, a first synchronization packet containing timing information regarding allocation of resources in the first piconet, a scheduler configured to determining interference time slots corresponding to allocated transmissions times for nodes in the first piconet, based on the timing information, and logic configured to establish a second piconet by allocating available resources to nodes in the second piconet based on the determined interference time slots corresponding to allocated transmissions times for the nodes in the first piconet.

Certain aspects of the present disclosure provide a computer-program product for communications, comprising a computer-readable medium comprising instructions. The instructions are generally executable to receive, from a first node in a first piconet, a first synchronization packet containing timing information regarding allocation of resources in the first piconet, determine interference time slots corresponding to allocated transmissions times for nodes in the first piconet, based on the timing information, and establish a second piconet by allocating available resources to nodes in the second piconet based on the determined interference time slots corresponding to allocated transmissions times for the nodes in the first piconet.

Certain aspects of the present disclosure provide a method of wireless communication. The method generally includes performing ranging operations for a destination node that is to receive wirelessly distributed video and adjusting at least one of a bandwidth or resolution of the wirelessly distributed video based on results of the ranging operations.

Certain aspects of the present disclosure provide an apparatus for wireless communication. The apparatus generally includes ranging logic configured to perform ranging operations for a destination node that is to receive wirelessly distributed video and adjusting logic configured to adjust at least one of a bandwidth or resolution of the wirelessly distributed video based on results of the ranging operations.

Certain aspects of the present disclosure provide an apparatus for wireless communication. The apparatus generally includes means for performing ranging operations for a destination node that is to receive wirelessly distributed video and means for adjusting at least one of a bandwidth or resolution of the wirelessly distributed video based on results of the ranging operations.

Certain aspects of the present disclosure provide a wireless video source. The wireless video source generally includes at least one antenna, ranging logic configured to perform ranging operations, based on packets received via the at least one antenna, for a destination node that is to receive wirelessly distributed video, and adjusting logic configured to adjust at least one of a bandwidth or resolution of the wirelessly distributed video based on results of the ranging operations.

Certain aspects of the present disclosure provide a computer-program product for communications, comprising a computer-readable medium comprising instructions. The instructions are generally executable to perform ranging operations for a destination node that is to receive wirelessly distributed video and adjust at least one of a bandwidth or resolution of the wirelessly distributed video based on results of the ranging operations.

DETAILED DESCRIPTION

Figure 1:
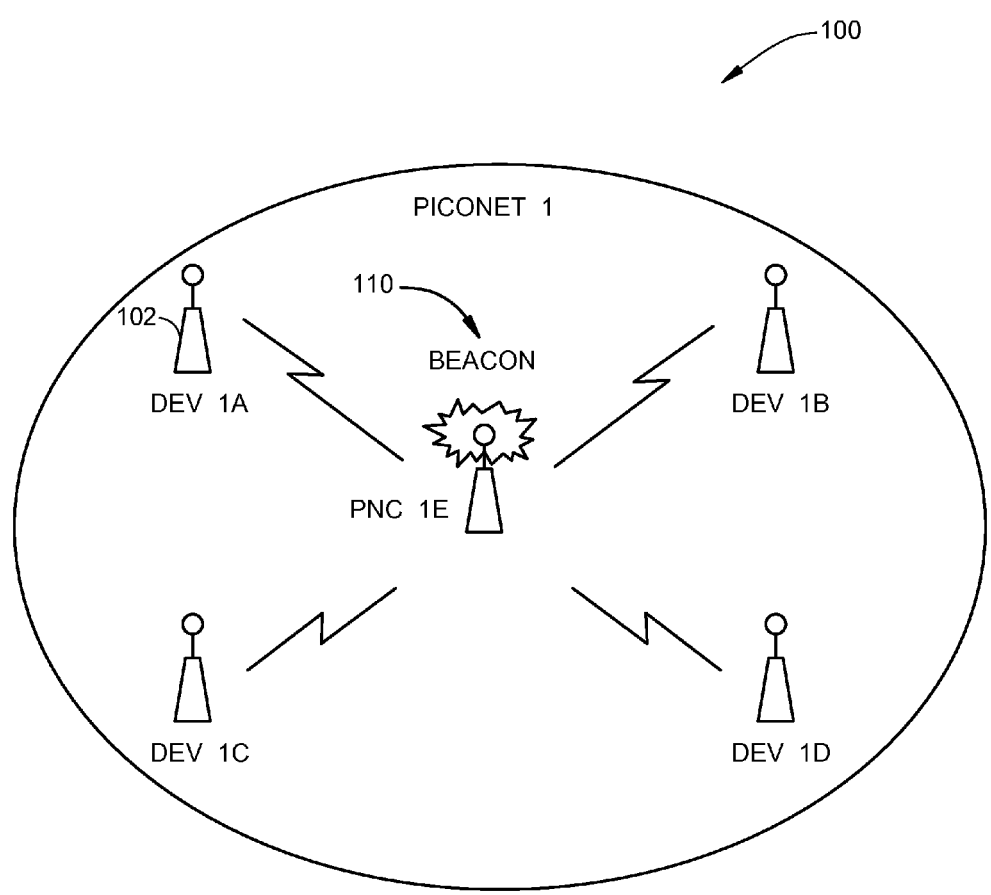
FIG. 1 illustrates an example piconet, in accordance with certain aspects of the present disclosure.

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects.

In the following detailed description, various aspects of the invention may be described in the context of a wireless network or "piconet" in accordance the IEEE 802.15 family of standards (whether adopted or proposed). While these inventive aspects may be well suited for use with such networks in which an access point (AP) may serve as a piconet coordinator (PNC), those skilled in the art will readily appreciate that these inventive aspects are likewise applicable for use in various other communication environments utilizing any type of access points (APs) and access terminals (ATs), including, but not limited to, networks in accordance with IEEE 802.11 family of standards and may, in fact, allow networks in accordance with different standards to better co-exist. Accordingly, any reference to an IEEE 802.15 compliant network is intended only to illustrate the inventive aspects, with the understanding that such inventive aspects have a wide range of applications.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium.

In some aspects, the node is a wireless node. Such wireless nodes may provide, for example, connectivity for or to a network (e.g., a personal area network or piconet, wide area network such as the Internet, or a cellular network) via a wired or wireless communication link.

An Example Piconet

FIG. 1 illustrates an example piconet, Piconet 1. As shown, Piconet 1 may include a number of wireless devices 102 or "terminals" 1A-1E that can communicate with one another using relatively short-range wireless links 104. In the illustrated example, terminal 1E acts as a PNC for Piconet 1. Although illustrated with five devices, it should be appreciated that any number of devices (i.e., two or more) may form a wireless personal area network.

Each of the terminals 102 in the Piconet 1 may include, among other things, a wireless transceiver to support wireless communication and controller functionality to manage communication with the network. The controller functionality may be implemented within one or more digital processing devices. The wireless transceiver may be coupled to one or more antennas to facilitate the transmission of signals into and the reception of signals from a wireless channel. Any type of antennas may be used including, for example, dipoles, patches, helical antennas, antenna arrays, and/or others.

The devices in the Piconet 1 may include any of a wide variety of different device types including, for example, laptop, desktop, palmtop, or tablet computers having wireless networking functionality, computer peripherals having wireless networking capability, personal digital assistants (PDAs) having wireless networking capability, cellular telephones and other handheld wireless communicators, pagers, wireless network interface modules (e.g., wireless network interface cards, etc.) incorporated into larger systems, multimedia devices having wireless networking capability, audio/visual devices having wireless networking capability, home appliances having wireless networking capability, jewelry or other wearable items having wireless networking capability, wireless universal serial bus (USB) devices, wireless digital imaging devices (e.g., digital cameras, camcorders, etc.), wireless printers, wireless home entertainment systems (e.g., DVD/CD players, televisions, MP3 players, audio devices, etc.), and/or others. In one configuration, for example, a wireless personal area network may include a user's laptop computer that is wirelessly communicating with the user's personal digital assistant (PDA) and the user's printer in a short-range network. In another possible configuration, a wireless personal area network may be formed between various audio/visual devices in, for example, a user's living room. In yet another configuration, a user's laptop computer may communicate with terminals associated with other users in a vicinity of the user. Many other scenarios are also possible.

Standards have been developed, and are currently in development, to provide a framework to support development of interoperable products that are capable of operating as part of a wireless personal area network (e.g., the Bluetooth standard (Specification of the Bluetooth System, Version 1.2, Bluetooth SIG, Inc., November 2003), the IEEE 802.15 standards, etc.). The IEEE 802.15.3 standard, for example, is a high data rate wireless personal area network standard. In accordance with the IEEE 802.15.3 standard, one of the terminals within a piconet is selected as a Piconet Coordinator (PNC) to coordinate the operation of the network. For example, with reference to FIG. 1, the device PNC 1E represents a PNC for the Piconet 1 in an IEEE 802.15.3 implementation.

As shown, PNC 1E may transmit a beacon signal 110 (or simply "beacon") to other devices of Piconet 1, which may help the other terminals within Piconet 1 synchronize their timing with PNC 1E. Thus, the beacon, typically sent at the beginning of every superframe, contains information that may be used to time-synchronize the terminals in the piconet. Each terminal in the piconet, including the PNC, may reset its superframe clock to zero at the beginning of the beacon preamble. If a terminal does not hear a beacon, it may reset its superframe clock to zero at the instant where it expected to hear the beginning of the beacon preamble (e.g., based on previous superframe timing).

Example Terminal Components

Figure 2:
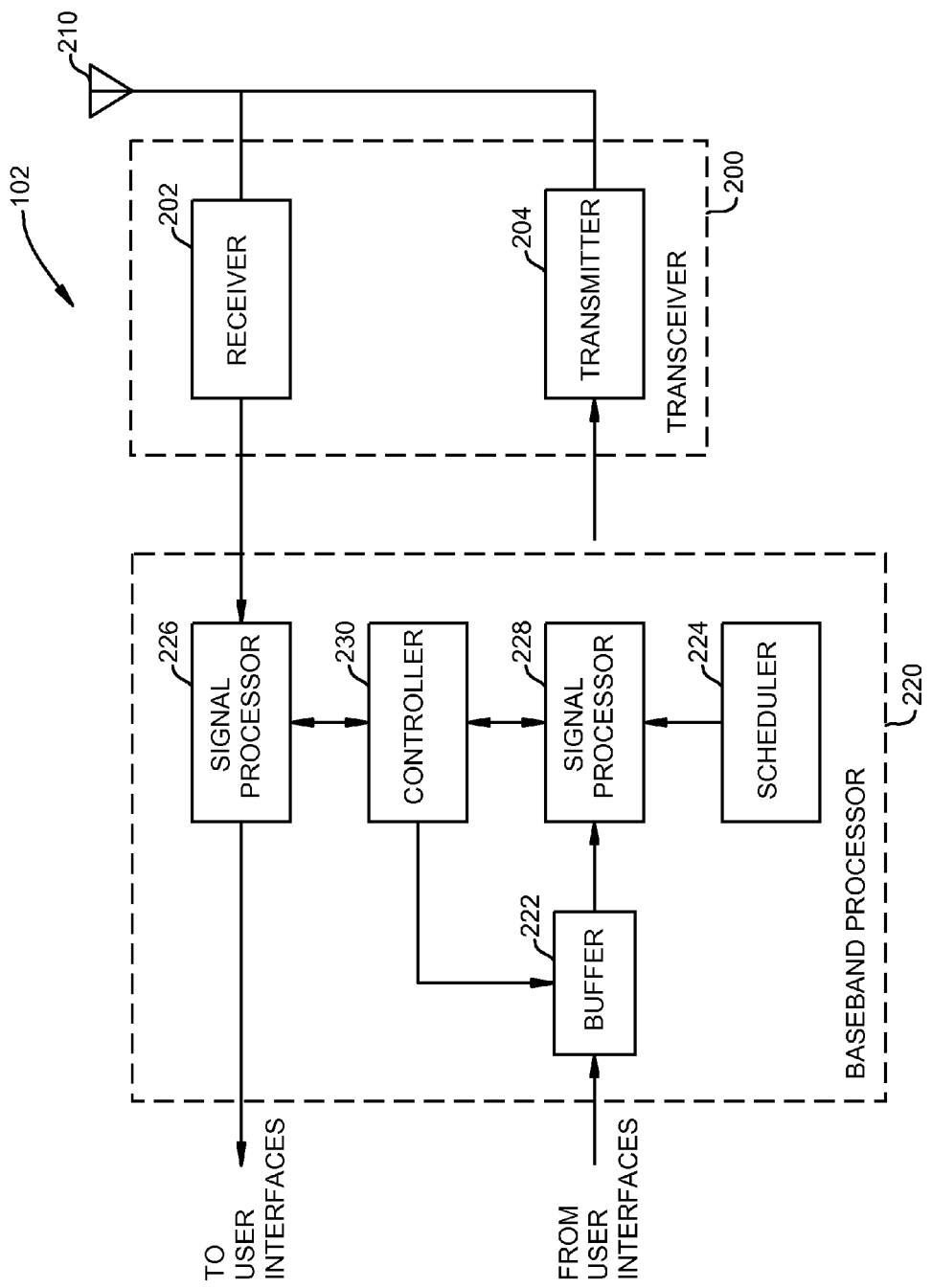
FIG. 2 illustrates example components of a piconet terminal, in accordance with certain aspects of the present disclosure.

FIG. 2 illustrates example components of a terminal 102 capable of performing operations in accordance with certain aspects of the present disclosure. As those skilled in the art will appreciate, the precise configuration of the terminal 102 may vary depending on the specific application and the overall design constraints and any suitable combination of components capable of performing the operations presented herein may be utilized.

In the example configuration illustrated, the terminal 102 may be implemented with a front-end transceiver 200 coupled to an antenna 210. A baseband processor 220 may be coupled to the transceiver 200. The baseband processor 220 may be implemented with a software based architecture, or another type of architecture. The software based architecture may be configured with a microprocessor (not shown) that serves as a platform to run software programs that, among other things, provide executive control and overall system management functions that allow the terminal to operate either as a master or member terminal in a piconet. The baseband processor 220 may also include a digital signal processor (DSP) (not shown) with an embedded communications software layer which runs application specific algorithms to reduce the processing demands on the microprocessor. The DSP may be used to provide various signal processing functions such as pilot signal acquisition, time synchronization, frequency tracking, spread-spectrum processing, modulation and demodulation functions, and forward error correction.

The baseband processor 220 is shown with the transceiver 200. The transceiver 200 may include a receiver 202. The receiver 202 provides detection of desired signals in the presence of noise and interference. The receiver 202 may be used to extract the desired signals and amplify them to a level where information contained in the received signal can be processed by the baseband processor 220.

The transceiver 200 may also include a transmitter 204. The transmitter 204 may be used to modulate information from the baseband processor 220 onto a carrier frequency. The modulated carrier may be upconverted to an RF frequency and amplified to a sufficient power level for radiation into free space through the antenna 210.

The baseband processor 220 may be responsible for configuring the terminal as a master or member terminal of the piconet depending on the results of the pilot signal acquisition process. When the baseband processor 220 configures the terminal as a member terminal of the piconet, a signal processor 228 on the receiving end may be used to extract scheduling information broadcast by the piconet master terminal over one or more control channels. The signal processor 228 may use spread-spectrum processing, in conjunction with digital demodulation and forward error correction techniques, to extract the pertinent scheduling information from the control channel and provide it to a controller 230 for processing. The controller 230 may use the scheduling information to determine the time slots for the various transmissions to and from the member terminal, as well as the power level and data rate for each.

In the receive mode, the controller 230 may be used to provide data rate and spreading information to the signal processor 228 on the receiving end for the scheduled transmissions to the member terminal. Using this information, the signal processor 228 may recover information embedded in the transmissions from other terminals at the appropriate times and provide the recovered information to the various user interfaces.

A signal processor 228 on the transmitting end may be used to spread information destined for various other terminals. The information may be originated from various user interfaces and stored in a buffer 222 until the scheduled transmission. At the scheduled time, the controller 230 may be used to release the information from the buffer 222 to the signal processor 228 for spread-spectrum, processing. The signal processor 228 may also employ digital modulation and forward error correction techniques. The data rate, spreading code and power level of the transmission may be programmed into the signal processor 228 by the controller 230. Alternatively, the transmission power level may be programmed by the controller 230 at the transmitter 204 in the transceiver 200.

When the baseband processor 220 configures the terminal as the master terminal of the piconet, it may enable a scheduler 224. In a software-based implementation of the baseband processor 220, the scheduler 224 may be a software program running on the microprocessor. However, as those skilled in the art will readily appreciate, the scheduler 224 is not limited to this aspect, and may be implemented by other means known in the art, including a hardware configuration, firmware configuration, software configuration, or combination thereof, which is capable of performing the various functions described herein.

The scheduler 224 may be used to generate scheduling information to support intra-piconet communications. The scheduling information may be derived based on any number of considerations and/or in accordance with any known scheduling algorithm. By way of example, scheduling information may be made based on a priority system, where voice communications are given priority over high latency communications. The scheduler 224 may also give priority to high data rate transmissions in an effort to maximize throughput. Further increases in throughput may be achieved by scheduling parallel transmissions using spread-spectrum techniques. By carefully selecting the terminal pairs that will engage in parallel communications, intra-piconet interference may be managed. A fairness criterion that considers the amount of data to be transferred between terminal pairs and the delay already experienced by such terminal pairs may also be considered. Other factors may be considered and are within the scope of the invention. Those skilled in the art will be readily able to adapt existing scheduling algorithms to any particular piconet application.

Overcoming Limitations of Standard Beacons

Figure 3:
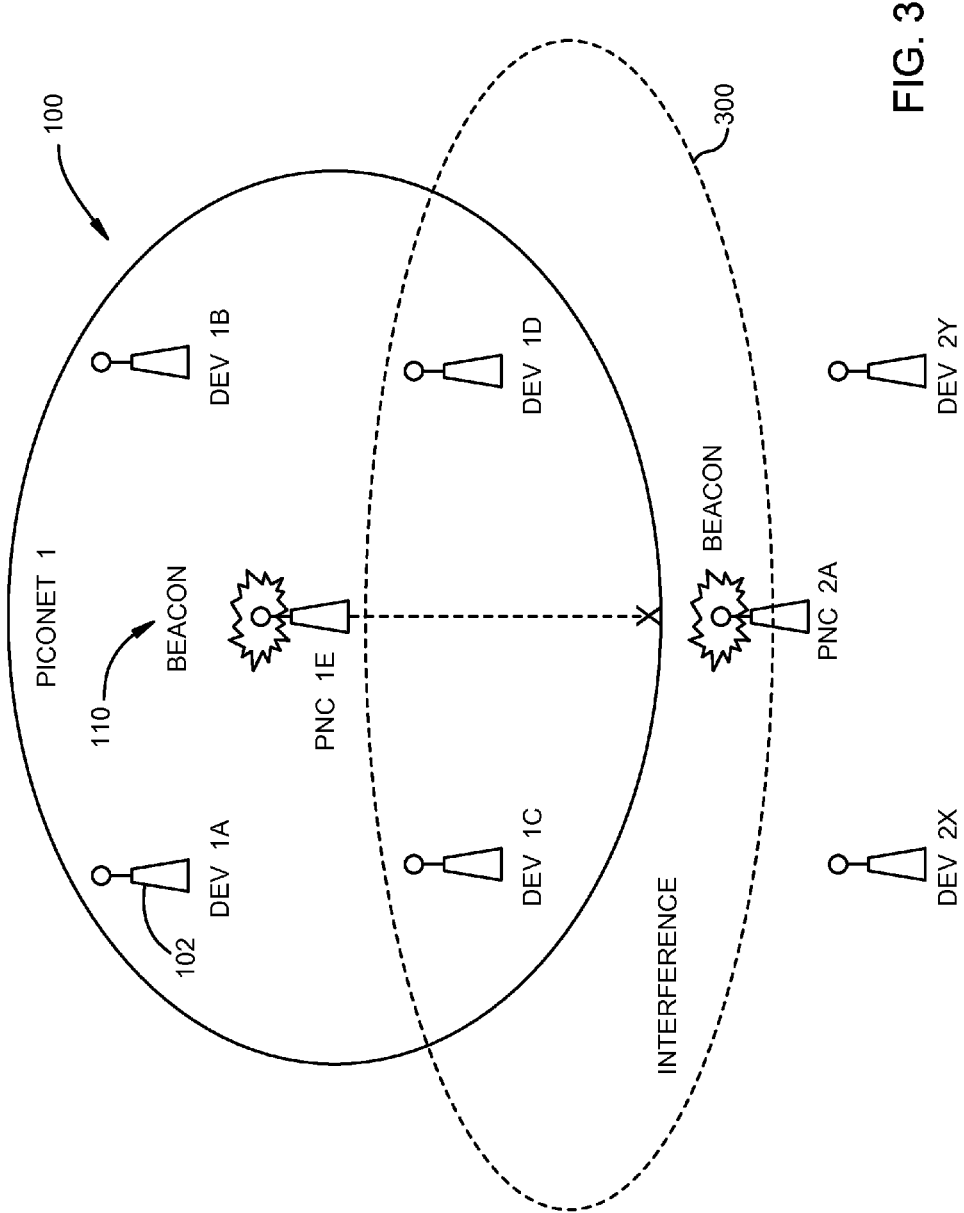
FIG. 3 illustrates an example piconet with nearby terminals that are not included in the piconet.

FIG. 3 is a conceptual diagram illustrating an example of a piconet 100 (Piconet 1) having nearby terminals 102 that are not included in the piconet. The piconet 100 may be considered a mesh network with a partial mesh topology. A partial mesh network generally refers to a local area network (LAN) that has some nodes that are connected to all the others (e.g., PNC) and some nodes (e.g., DEVs) that are connected only to those other nodes with which they exchange the most data. As will be described herein, the transmission of synchronization packets containing piconet timing information may be used to help establish and maintain such mesh networks.

The illustrated example assumes the nearby terminals PNC 2A, DEV 2X and DEV 2Y are located in relatively close proximity to Piconet 1, but that PNC 2A is outside the range of transmissions from PNC 1E. The example further assumes that PNC 2A is in transmission range of DEV 1C and DEV 1D.

Since PNC 2A does not receive any beacon signals 110 from PNC 1E (as indicated by the "X" in FIG. 3), PNC 2A is unaware of frequency/time slot assignments within Piconet 1. As a result, PNC 2A may thus attempt to transmit in one or more of the frequency/time slots assigned within Piconet 1. For example, unaware of Piconet 1, PNC 2A may form a second piconet, Piconet 2, with terminals 2X and 2Y. The formation of Piconet 2 may result in an interference zone 300 where transmissions from terminals in the different piconets may interfere. In the illustrated example, terminals 1C and 1D included in Piconet 1 are also within range of Piconet 2 and may, thus, experience interference due to conflicting transmissions from Piconet 2 in the same frequency/time slots.

Certain aspects of the present disclosure, however, may overcome this problem by having all types of terminals included in a piconet (e.g., not just terminals acting as a PNC) transmit beacon signals, referred to herein as unified synchronization packets including synchronization data for the piconet. By having all types of terminals transmit synchronization packets, the range of devices capable of detecting an existing piconet (and the resources allocated to terminals of the existing piconet) may be significantly increased relative to the standard situation with only the PNC transmitting synchronization beacons. In other words, nodes that were previously "hidden" from the PNC of a nearby piconet may learn of the piconet via detection of these sync packets transmitted from non-PNC terminals within range. As a result, the unified synchronization packets may help terminals in proximity of an existing piconet avoid transmitting in the same frequency/time slots allocated to devices in the existing piconet and may, thus, help reduce interference and help support coexistence of adjacent networks.

Figure 4:
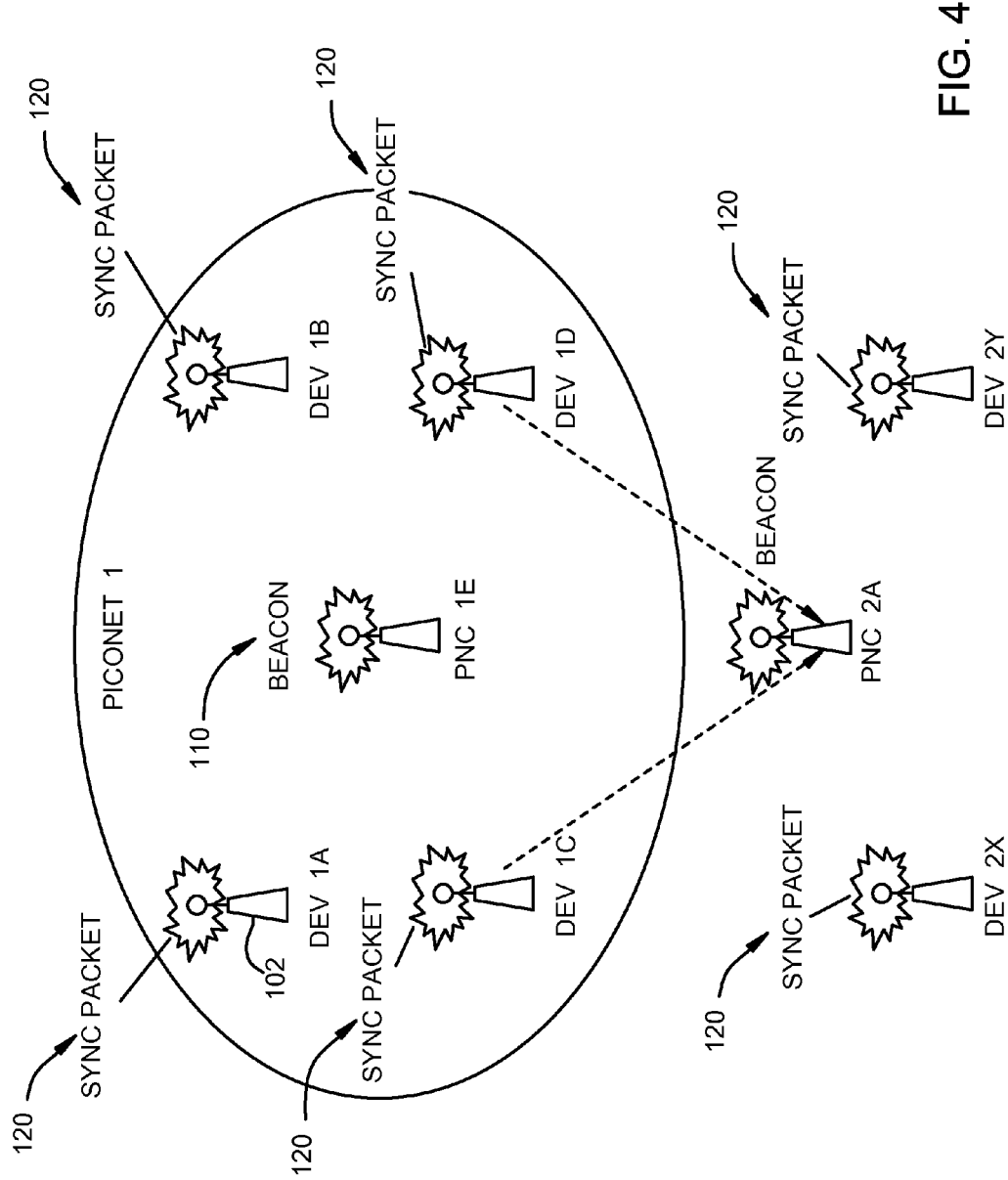
FIG. 4 is a conceptual diagram illustrating an example of interference between terminals in a piconet and nearby terminals that are not included in the piconet.

FIG. 4 illustrates synchronization packets 120 being transmitted from all non-PNC terminals in a piconet to reduce transmission interference between a piconet and nearby terminals, in accordance with certain aspects of the present disclosure. As illustrated terminals acting as PNCs (e.g., PNC 1E and PNC 2A) may continue to transmit conventional beacon signals.

As shown, each non-PNC terminal (e.g., DEV 1A, DEV 2X, etc.) transmits a synchronization packet, or "sync packet." Such sync packets may be transmitted alone or as part of other transmissions (e.g., data frames). Each terminal may transmit a single sync packet, or may transmit multiple sync packets. For example, the terminal may transmit a sync packet upon receiving an allocated/assigned frequency/time slot from a PNC, may transmit a sync packet between every superframe, may transmit in a repeating time cycle, may transmit according to fixed schedule, and the like.

For certain aspects, sync packets may be sent in a manner that allows terminals having a variety of different types of physical layers (PHY) detect them. For example, the IEEE 802.15.3c defines various PHY modes, and devices may be configured to transmit sync packets using a single carrier (SC) that may be detectable by other devices (even if they normally operate in an OFDM mode). Such "unified" sync packets may also help promote the co-existence of networks with different PHY layers. For example, sync packets may be sent from IEEE 802.15 compliant devices in a manner that allows both IEEE 802.15 compliant and IEEE 802.11 compliant devices to detect them. For certain aspects, this may allow devices, such as those compliant with the proposed IEEE 802.11 VHT60 standard with IEEE 802.11 PHY and Medium Access Control (MAC) Layers, to operate in the 60 GHz frequency band (typically 57-66 GHz) with very high throughput, while coexisting with IEEE 802.15.3c systems (and with other systems operating in a similar band).

For certain aspects, each terminal (e.g., PNC-capable and non PNC-capable terminals) may be configured to scan for and detect sync packets and/or beacon signals. For certain aspects, only PNC-capable terminals may be configured to scan for and detect sync packets and/or beacon signals. In any case, by receiving such synchronization information, a terminal can learn of an existing piconet. Further, the receiving terminal may use the synchronization information to avoid interfering with the existing piconet.

For example, referring to FIG. 4, PNC 2A may receive sync packets 120 transmitted by DEV 1C and/or DEV 1D. Because these sync packets may include synchronization information regarding timing and resource allocation for Piconet 1, PNC 2A may avoid transmissions that would cause interference to devices in Piconet 1. For example, PNC 2A may control transmissions to/from DEV 2X and DEV 2Y so they avoid frequency/time slots assigned within Piconet 1, thereby reducing or eliminating any interference with Piconet 1. To accomplish this, the PNC 2A may synchronize its timing with the timing of PNC 1.

Figure 5:
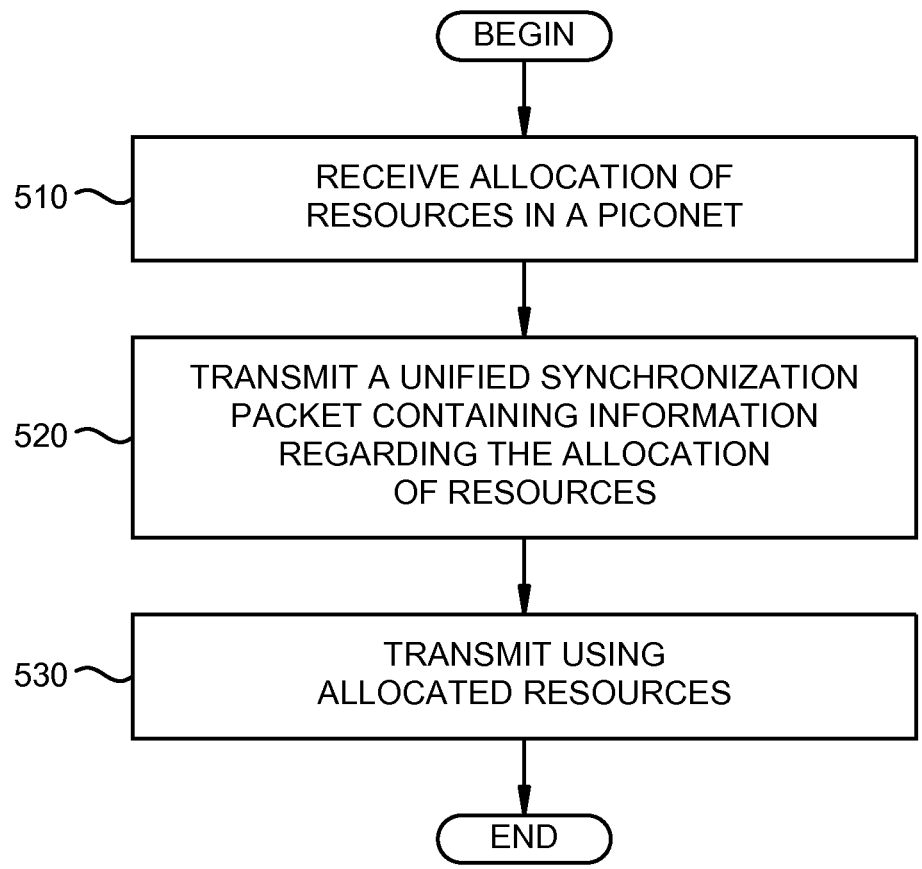
FIG. 5 illustrates example operations for transmitting a unified synchronization packet, in accordance with certain aspects of the present disclosure.

FIG. 5 is a flow diagram illustrating operations 500 for transmitting a unified synchronization packet, in accordance with certain aspects of the present disclosure. FIG. 5 illustrates operations performed, for example, by a non-PNC device included in a piconet.

For the sake of illustration, the operations are described below in conjunction with the example illustrated in FIG. 4. The operations begin at 510, where a non-PNC terminal receives an allocation of transmission resources in a piconet. For example, DEV 1C may receive an allocation of frequency/time slots within Piconet 1 from PNC 1E.

At 520, the terminal may transmit a unified synchronization packet containing information regarding the allocation of resources within the piconet. An example of a unified synchronization packet, its format, and the information contained therein, is described below with reference to FIGS. 8-10.

At 530, the terminal may send transmissions according the resource allocation received at 510. A terminal may send sync packets at any suitable time. For certain aspects, a terminal may transmit when receiving an allocation for transmission. For example, in the case of an 802.15.3c device, each device may send a synchronization packet at least at the first time it receives an allocation to transmit (e.g., including an allocation for ACK packet). As a result, devices that receive these sync packets may become aware of the piconet, even if they are not in range to receive beacons from the piconet PNC.

Figure 6:
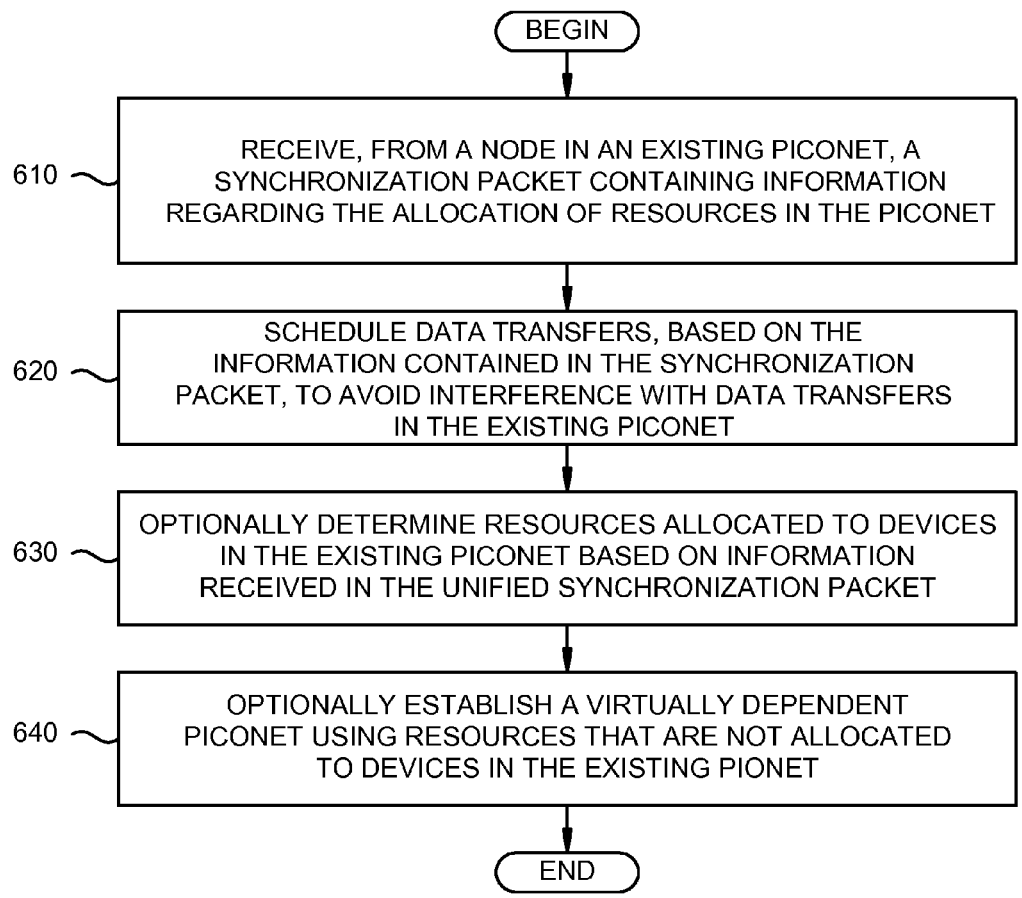
FIG. 6 illustrates example operations for processing a detected unified synchronization packet, in accordance with certain aspects of the present disclosure.

FIG. 6 illustrates example operations for processing a unified synchronization packet, in accordance with certain aspects of the present disclosure. For example, the operations of FIG. 6 may be performed by a PNC device not included in an existing piconet of a terminal that transmitted the synchronization packet.

The operations begin at 610, when a PNC learns of the existence of an existing piconet through the detection of a unified synchronization packet sent from one or more terminal devices of the existing piconet. For example, referring to FIG. 4, PNC 2A may receive a sync packet sent by DEV 1C or DEV 1D, and may thus learn of the existence of Piconet 1.

At 620, the PNC determines a superframe start time and duration corresponding to the existing piconet based on information contained in the unified synchronization packet. The PNC may use such synchronization information to avoid sending transmissions that interfere with Piconet 1. For certain aspects, there may be no fixed timing requirements for exactly when to send a synchronization packet. Therefore, in order to allow a receiving terminal to determine timing information (such as the start of a superframe) of the existing piconet, the sync packet may include a timestamp indicating when the sync packet is sent. The time stamp may be generated by the device sending the sync packet, for example, based on an internal counter reset at the start of a superframe when a beacon signal is received. A device receiving a sync packet may thus be able to determine the start time of a superframe of the existing piconet based on the time stamp.

For certain aspects, a PNC receiving a synchronization packet may use the information contained therein about an existing piconet to establish a piconet that is "virtually dependent" on the existing piconet, generally meaning that the piconet may coexists with an existing piconet by avoiding using allocated resources of the existing piconet. The PNC may establish a virtually dependent piconet, such as Piconet 2 illustrated in FIG. 7, for example, by performing optional operations 630 and 640.

At 630, the PNC may determine resources allocated to devices in the existing piconet based on information received in the unified synchronization packet. At 640, the PNC may establish a virtually dependent piconet using resources that are not allocated in the existing piconet. As will be described in greater detail below, the synchronization packet may include Channel Time Allocation (CTA) information elements (IEs) indicating resources allocated to terminals in the existing piconet.

Figure 7:
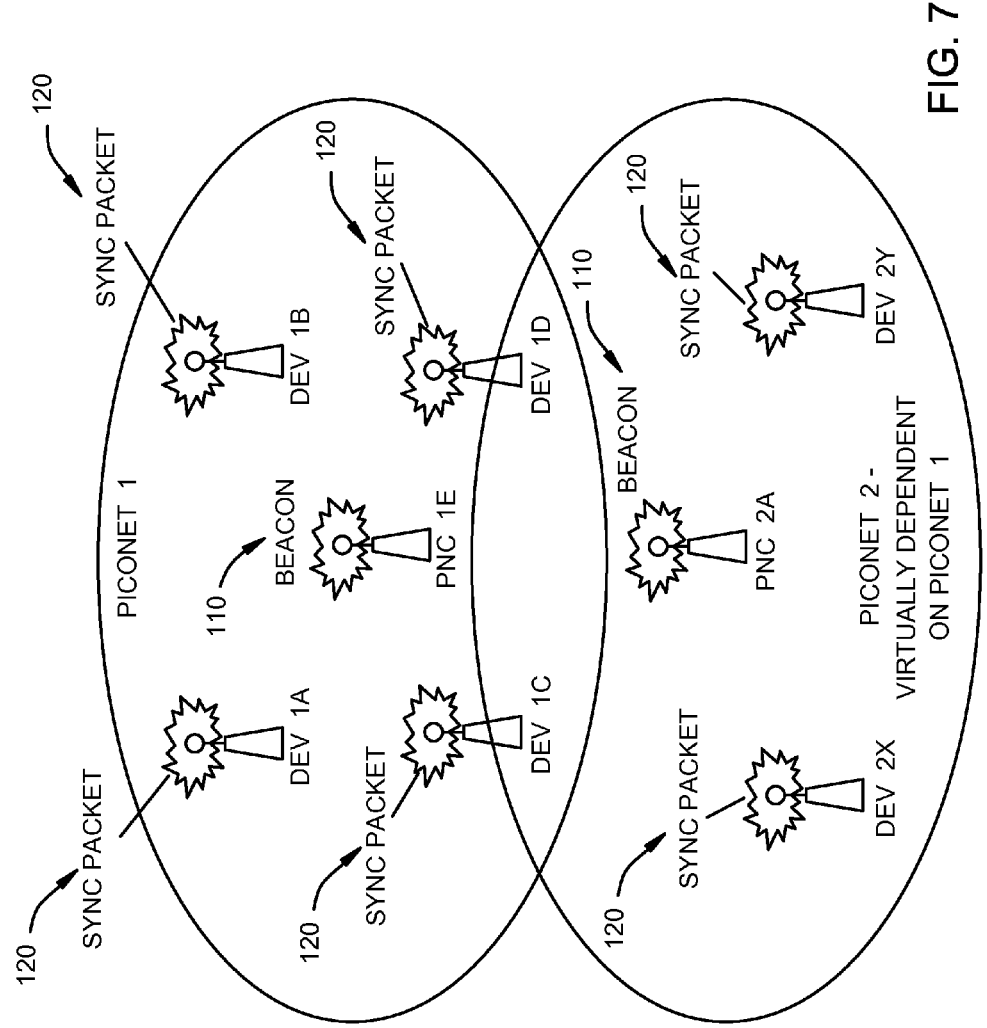
FIG. 7 illustrates an example of a piconet that is virtually dependent on another piconet, in accordance with certain aspects of the present disclosure.

For example, referring to FIG. 7, PNC 2A may determine resource allocation information for Piconet 1 from information in a sync packet 120 sent by DEV 1C or DEV 1D. PNC 2A may then establish Piconet 2 as being virtually dependent on Piconet 1, using available resources that are not already allocated in Piconet 1.

According to certain aspects, a PNC may perform a periodic scan of the CTA IEs of neighboring piconets (included in the sync packets) to map and mask interference zones as part of virtual dependent piconet maintenance. For example, through these periodic scans, the PNC may learn of changes to resource allocation in the existing piconet and make corresponding adjustments to resource allocations in the virtually dependent piconet.

Figure 8:
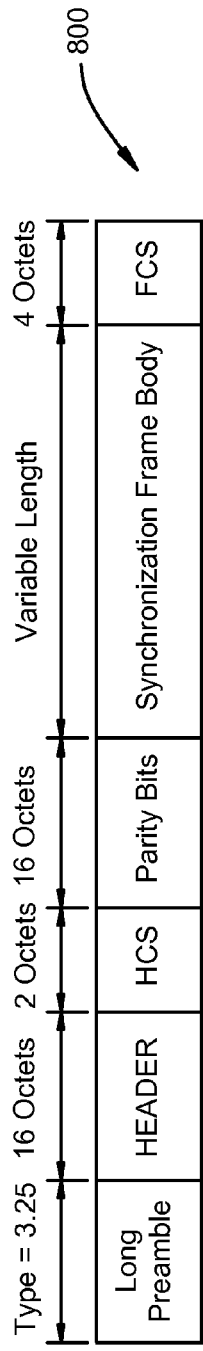
FIG. 8 illustrates an example synchronization frame format, in accordance with certain aspects of the present disclosure.

FIG. 8 illustrates an example format 800 of a sync packet. The format may be similar or the same as a synchronization frame format used for synchronization frames (beacon signals) sent according the IEEE 802.15.3c standard. As shown, the synchronization frame format 800 may include a long preamble, a header, a Header Check Sequence (HCS), a set of parity bits, a synchronization frame body, and a Frame Check Sequence (FCS). The synchronization frame body may include synchronization information regarding an existing piconet, as well as an indication of resources allocated in the existing piconet.

Figure 9:
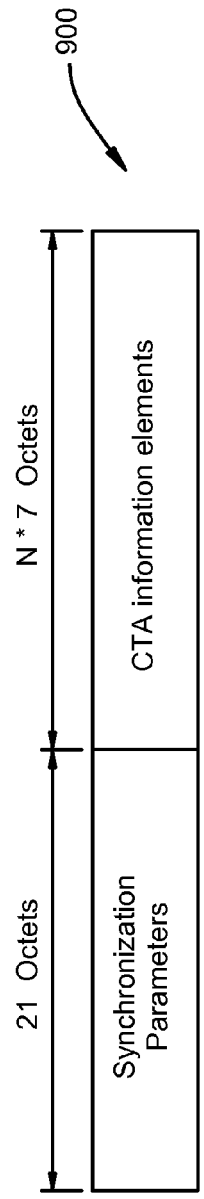
FIG. 9 illustrates an example synchronization frame body format, in accordance with certain aspects of the present disclosure.

FIG. 9 illustrates an example format of the synchronization frame body of the sync packet. In this example, the synchronization frame body format 900 may be similar to or the same as a synchronization frame format according to the IEEE 802.15.3c standard. As shown, the synchronization frame body format 900 may include synchronization parameters and Channel Time Allocation (CTA) information elements. For example, the CTA information elements may include frequency/time slots assigned to each terminal of a piconet. As described above, a PNC-capable device receiving the CTA IEs may use the information contained therein to identify resources available for allocation to terminals in a virtually dependent piconet.

Figure 10:
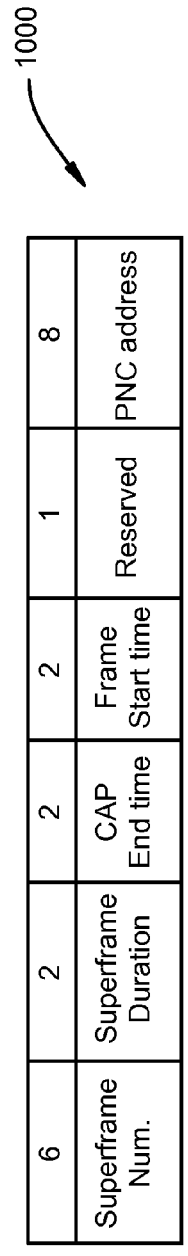
FIG. 10 illustrates an example synchronization parameters field format, in accordance with certain aspects of the present disclosure.

FIG. 10 illustrates example fields 1000 that may be included in the Synchronization Parameters, in accordance with certain aspects of the present disclosure. In this example, the synchronization parameters 1000 may include certain fields that are also used in the IEEE 802.15.3c standard. As illustrated, the synchronization parameters 1000 may include a superframe number, a superframe duration, a contention access period (CAP) end time, a frame start time, a reserved field, and a Piconet Coordinator (PNC) address.

The frame start time may include the time stamp described above, indicating when the sync packet was sent relative to the start of a superframe in the existing piconet. For example, since the common rate (CR) beacon in a piconet is transmitted by the PNC at the start (t=0) of the superframe, and the timing of sending sync packets by non-PNC terminals is not fixed (e.g., each device may only be required to send a synchronization packet at least at the first time its get allocation to transmit), the frame start time may be introduced.

This field provides the time stamp for the synchronization frame and marks the synchronization frame preamble start time. Thus, a PNC receiving the sync packet may use this time stamp to determine the start of a frame preamble and may then schedule data transfers in a manner that helps avoids interference with the existing piconet.

Thus, referring to FIG. 7, even though PNC 2A may not detect beacon signals 110 from PNC 1E, it may use information in the sync packets 120 from DEV 1C and DEV 2C to synchronize data transfers accordingly and form a virtually dependent piconet, Piconet 2. In so doing, PNC 2A may schedule data transfers for members of Piconet 2 (DEV 2X and DEV 2Y) in a manner that avoids interference with data transfers on Piconet 1.

Example Network Detection of and Synchronization

Figure 11:
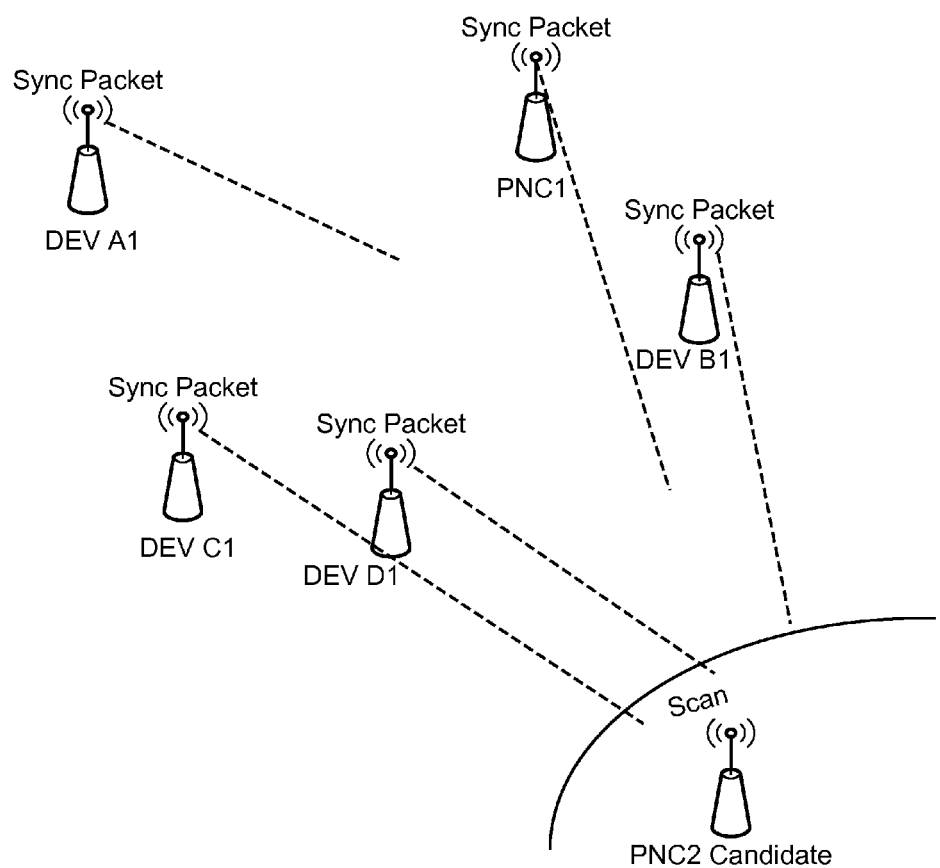
FIG. 11 illustrates an example of a candidate piconet coordinator (PNC) using synchronization frames to detect the presence of an existing piconet.

As illustrated in FIG. 11, a candidate PNC may periodically scan for sync frames transmitted from devices in neighboring networks. The candidate PNC may then use the timing information contained in the sync frames, to synchronize to its own timing. For example, the candidate PNC may determine "interference time slots" corresponding to allocated transmission times for devices in an existing piconet and allocate resources to devices in its own piconet in an effort to avoid these interference time slots. As long as the networks remain time synchronized, as is the case with virtually dependent piconets, the interference zone should remain constant in the time domain and the "interference time slots" can be marked for each neighboring network element.

Figure 12:
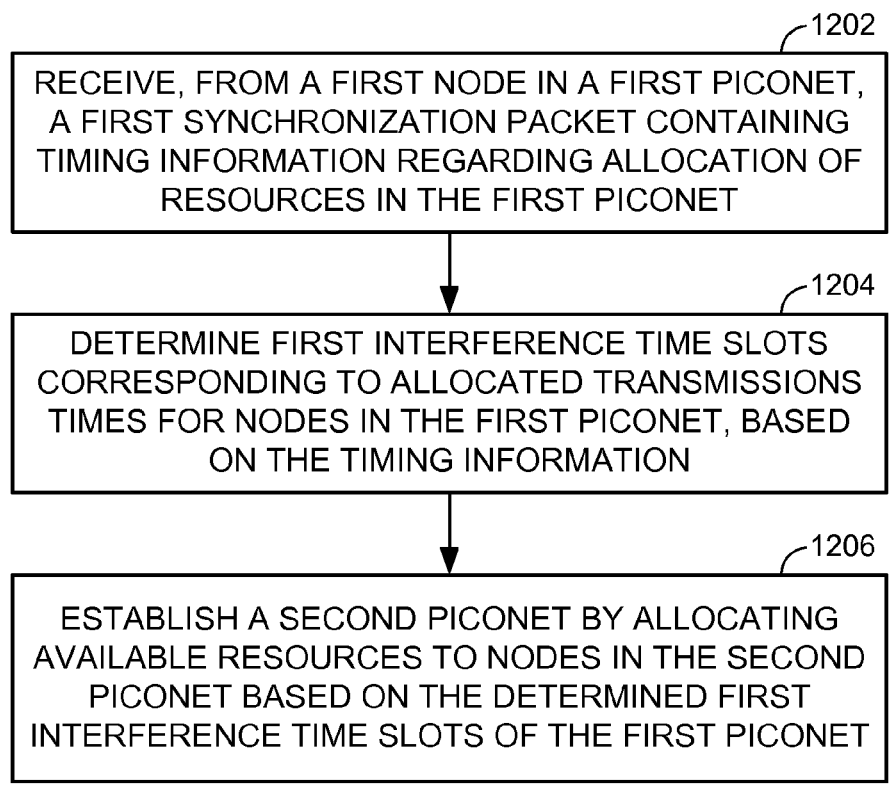
FIG. 12 illustrates example operations for scheduling synchronization frame transmissions, in accordance with certain aspects of the present disclosure.

FIG. 12 illustrates example operations for scheduling synchronization frame transmissions, in accordance with certain aspects of the present disclosure. For example, the operations may be performed by a PNC or candidate PNC to detect a neighbor piconet and adjust allocation of resources to its own piconet devices in an effort to avoid interference.

The operations begin, at 1202, with the PNC receiving, from a first node in a first piconet, a first synchronization packet containing timing information regarding allocation of resources in the first piconet. At 1204, the PNC determines interference time slots corresponding to allocated transmissions times for nodes in the first piconet, based on the timing information. At 1206, the PNC may establish a second piconet by allocating available resources to nodes in the second piconet based on the determined interference time slots corresponding to allocated transmissions times for nodes in the first piconet.

In this manner, the PNC may utilize synchronization packets it receives from devices in an existing piconet to synchronize its timing to the existing piconet and form a virtually dependent piconet.

Figure 13:
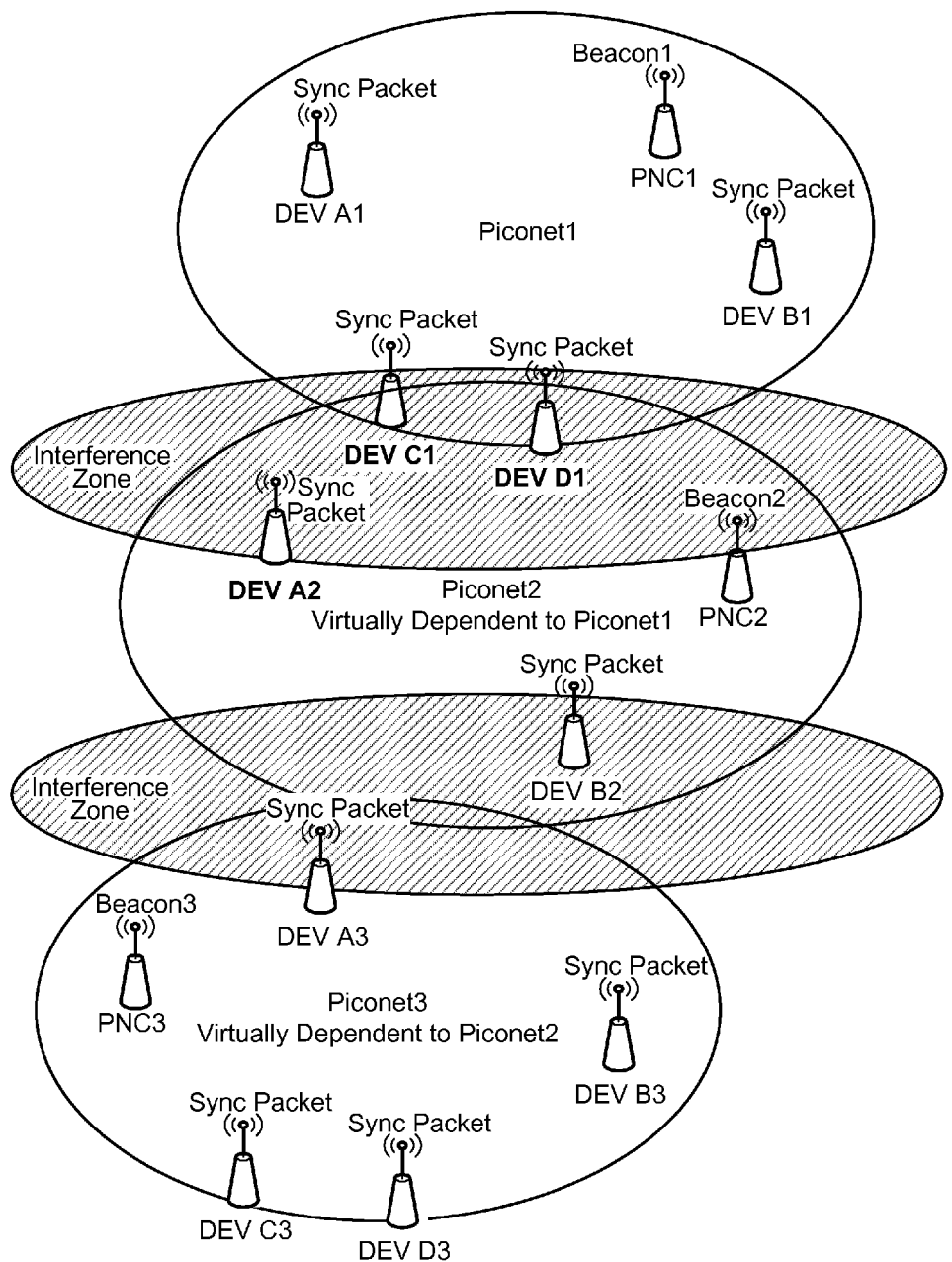
FIG. 13 illustrates an example of multiple virtually dependent piconets, in accordance with certain aspects of the present disclosure.

As illustrated in FIG. 13, multiple virtually dependent networks may be combined to form a mesh network. In the illustrated example, PNC3 utilizes synchronization packets it receives from devices in piconet2 to synchronize to PNC1 timing and forming a virtually dependent piconet 3.

Each PNC may schedule periodic scans of devices in its own network to detect interference and/or use data received from sync packets of devices in neighboring networks to calculate range from neighboring devices. As described above, each PNC may determine and map an "interference time slot" for each network element. Each PNC may then schedule data transfers for devices in its own on piconet in a manner that avoids interference between the piconets.

The total bandwidth used in a mesh network of virtually dependent or independent networks with no interference zone may be calculated as:

channel bandwidth*number of networks.

The total bandwidth used in a dependent network is channel bandwidth. The total bandwidth used in mesh network of virtually dependent network array with an interference zone may be calculated as:

channel bandwidth*number of networks−sum(interference zones bandwidth)

Thus, utilizing sync packets as described herein to mark and avoid interference zones may increase overall channel bandwidth in a mesh network.

Example Selection of a Network

A PNC candidate may select which piconet to join in the event that it receives sync packets transmitted from devices in more than one piconet. According to certain aspects, a PNC candidate may select a network based on a PNC address field and choose to join the piconet with the lower value of the PNC address field. This simple algorithm for synchronizing to the piconet with lower value of the PNC address field may apply for network controllers of an exiting piconet. In this scenario, the PNC with the higher address may adopt its timing parameters to synchronize to the piconet with lower value of the PNC address field.

According to certain aspects, in addition to scanning for sync packets during piconet creation, a PNC may also periodically scan for sync frames from neighboring piconets. The PNC may update its mapping of interference time slots of one or more neighboring piconets and avoid these interference time slots when allocating resources to its own devices.

A device may synchronize timing with a piconet multiple times in a piconet lifetime. Synchronizing multiple times allows a device to adjust its timing to account for dynamic changes in the piconet environment, for example, such as dynamic changes in interference as devices drift in and out of network coverage area.

Example Ranging Calculation Using Sync Packet Time Stamps

Figure 14:
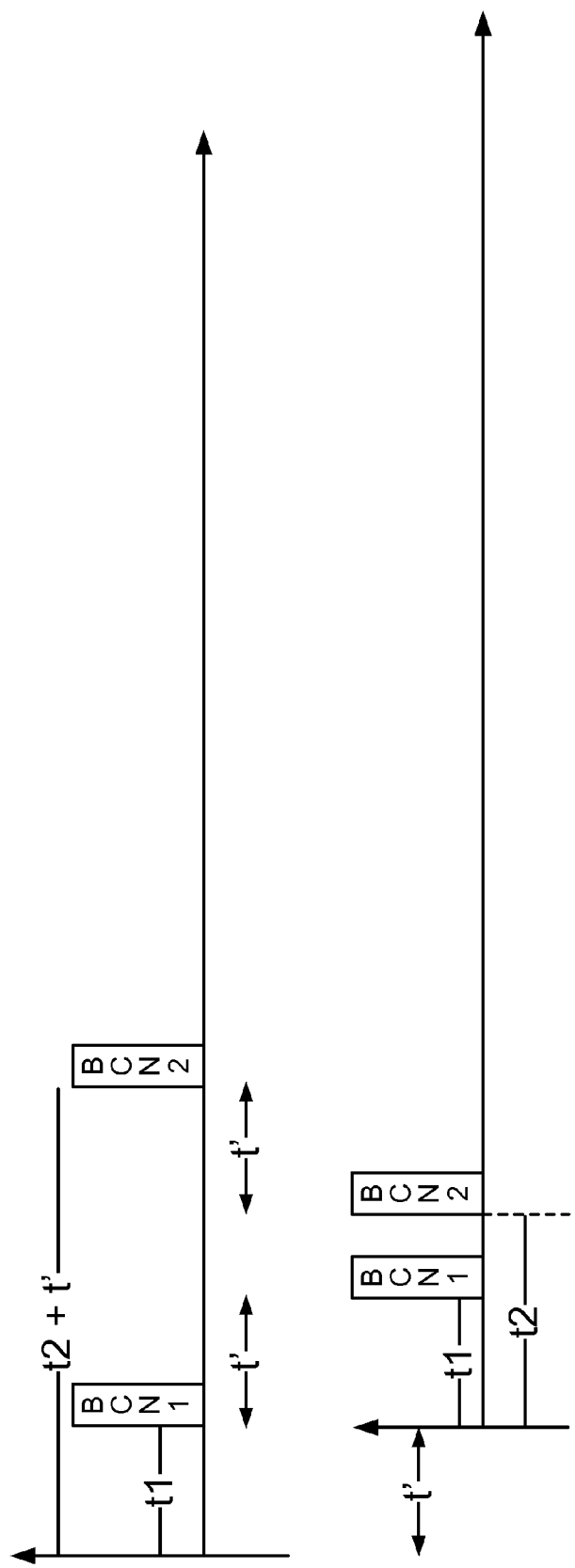
FIG. 14 illustrates an example range calculation using synchronization packet time stamps, in accordance with certain aspects of the present disclosure.

As described above, a PNC may utilize sync frames to perform ranging operations to determine a relative location of a device. FIG. 14 illustrates an example range calculation using synchronization packet time stamps, in accordance with certain aspects of the present disclosure. Station A may use timing information received to calculate a travel time (t') from the difference between the actual receive time and the transmit time stamp contained in the synchronization packet:

$$t' = t2rx - t2tx(\text{stamp})$$

As an illustrative example, assuming a 2.5 Gsps sample rate, this calculation may yield a +/−6 cm range accuracy, which may be more than adequate for many purposes, such as to perform station range adaptation.

One example application for such ranging operations involves wireless video distribution. Wireless video distribution systems may aim to replace standard cable transmission for video distribution while providing adequate performance and reliability.

Figure 15:
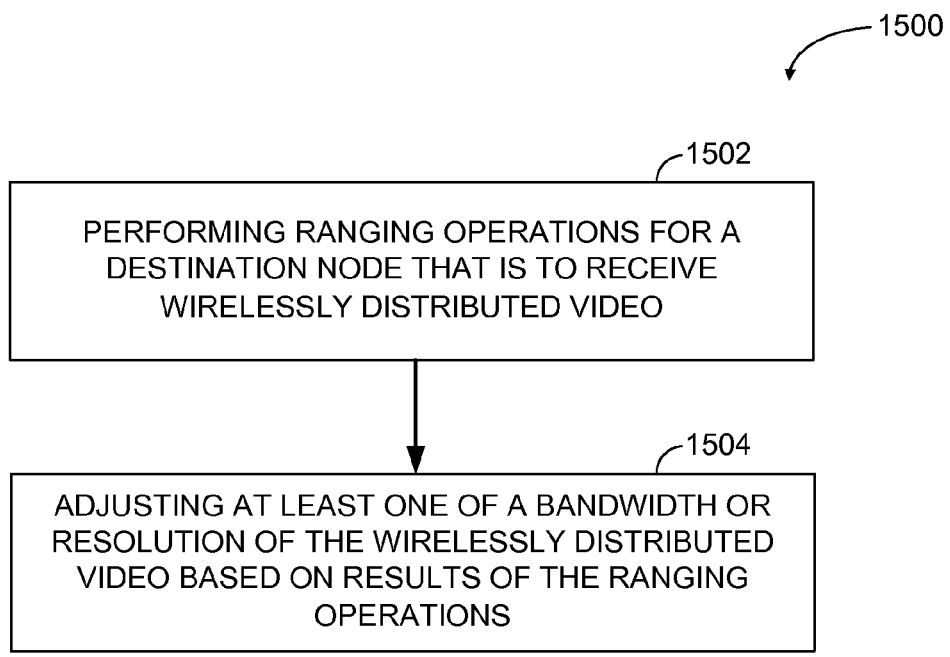
FIG. 15 illustrates example operations for ranging, in accordance with certain aspects of the present disclosure.
Figure 15A:
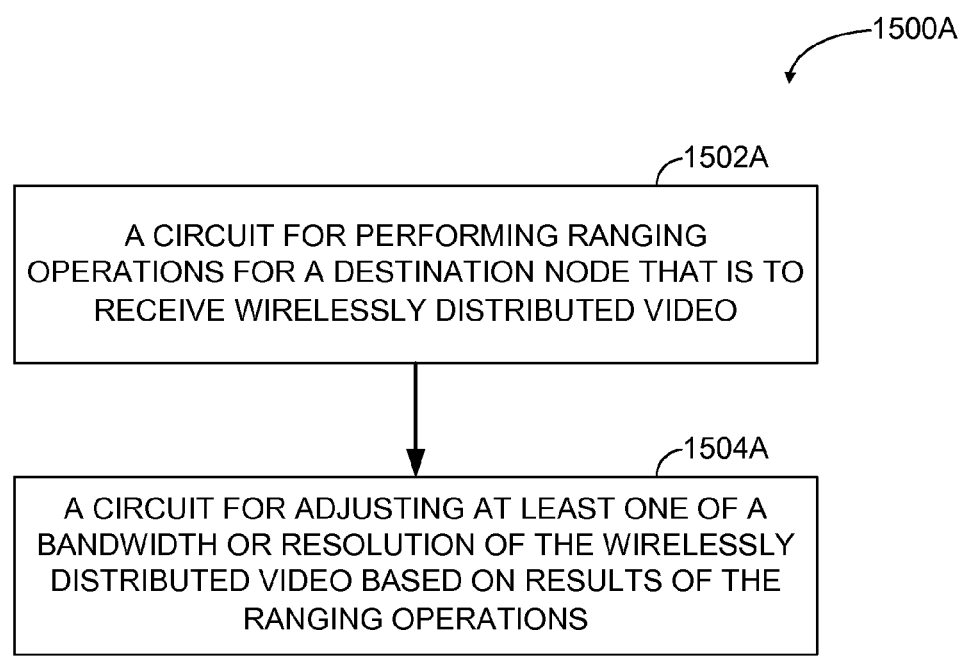
FIG. 15A illustrates example components capable of performing the operations shown in FIG. 15.

According to certain aspects, ranging techniques presented herein may be used to adopt at least one of the bandwidth or resolution (i.e., one or both) of wirelessly distributed video to the range between a wireless video source and a wireless video destination. As illustrated in FIG. 15, ranging operations for a destination node that is to receive wirelessly distributed video may be performed, at 1502. At least one of a bandwidth or resolution of the wirelessly distributed video may be adjusted based on results of the ranging operations, at 1504.

For example, range adaptation may be used to select foreground uncompressed high definition video display when a wireless video source and destination are in close proximity (e.g., Line of Site) for providing same user experience as wired HDMI cable. Such a range adaptation algorithm may control switching to a lower resolution when the wireless video source and destination are drawn away to Near Line of Site (e.g., in room). Such a range adaptation algorithm may also operate a background process for lower bandwidth/lower resolution, for example, when wireless video source and destination are not in the same room (e.g., non line of site) for video distribution in home.

When the video source is in close proximity to video destination (near line of site) it mat be configured to use maximum bandwidth to stream video to the video destination (e.g., for display and/or storage). As a result, a user may enjoy maximum resolution for display and/or fastest syncing time. When the video source moves further away from the destination, the display resolution can be lower and/or video transfer can seamlessly switch to background process using lower bandwidth.

While the ranging technique described above, based on timestamps in synchronization packets, may be used to determine the proximity of the video destination to the video source, any other suitable ranging technique may also be used and the bandwidth and/or resolution of the distributed video may be adapted accordingly.

Figure 5A:
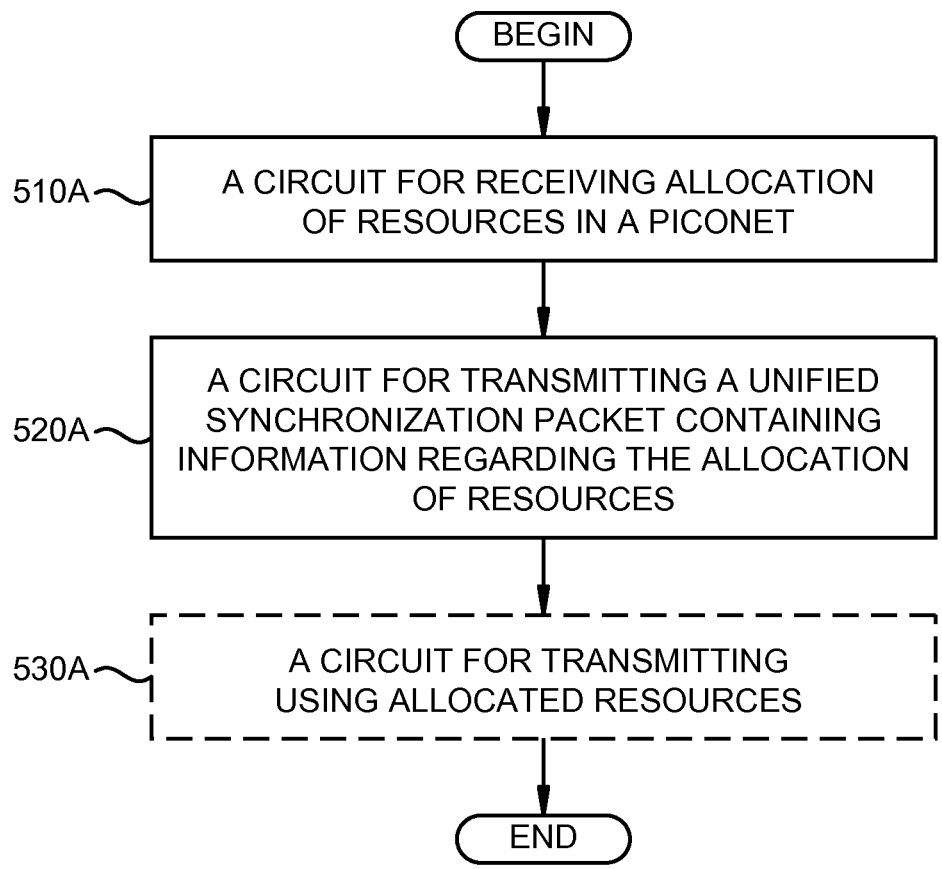
FIG. 5A illustrates example components capable of performing the operations shown in FIG. 5.
Figure 6A:
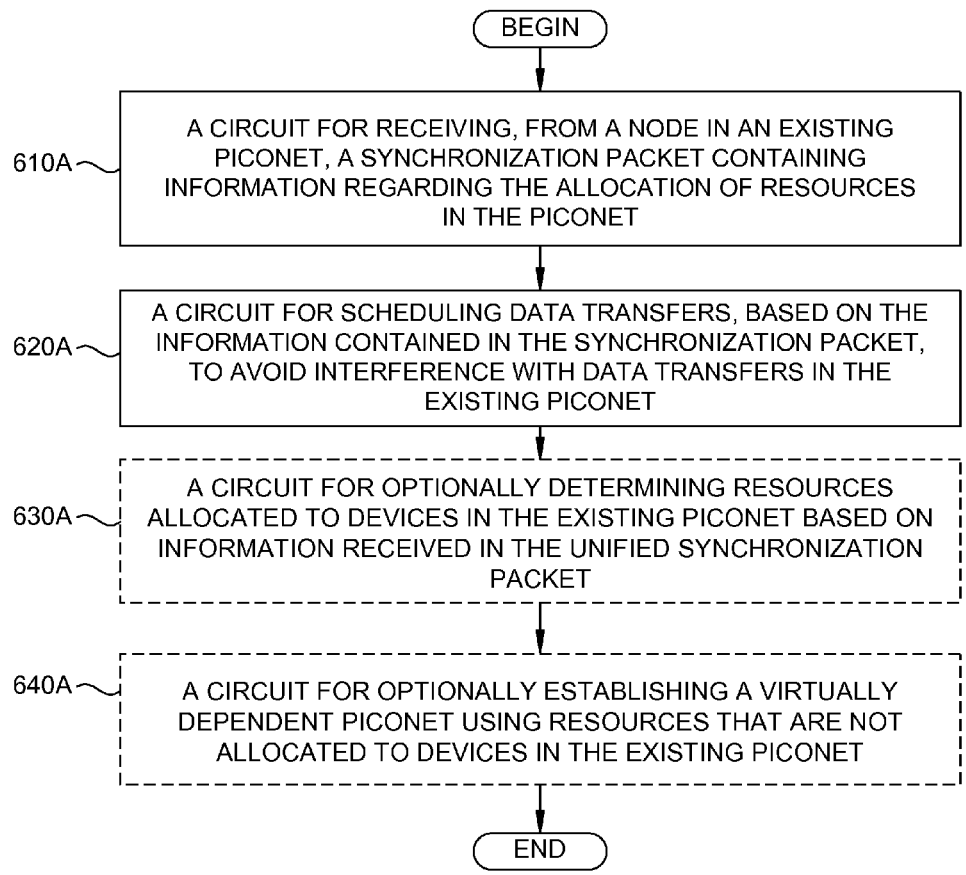
FIG. 6A illustrates example components capable of performing the operations shown in FIG. 6.
Figure 12A:
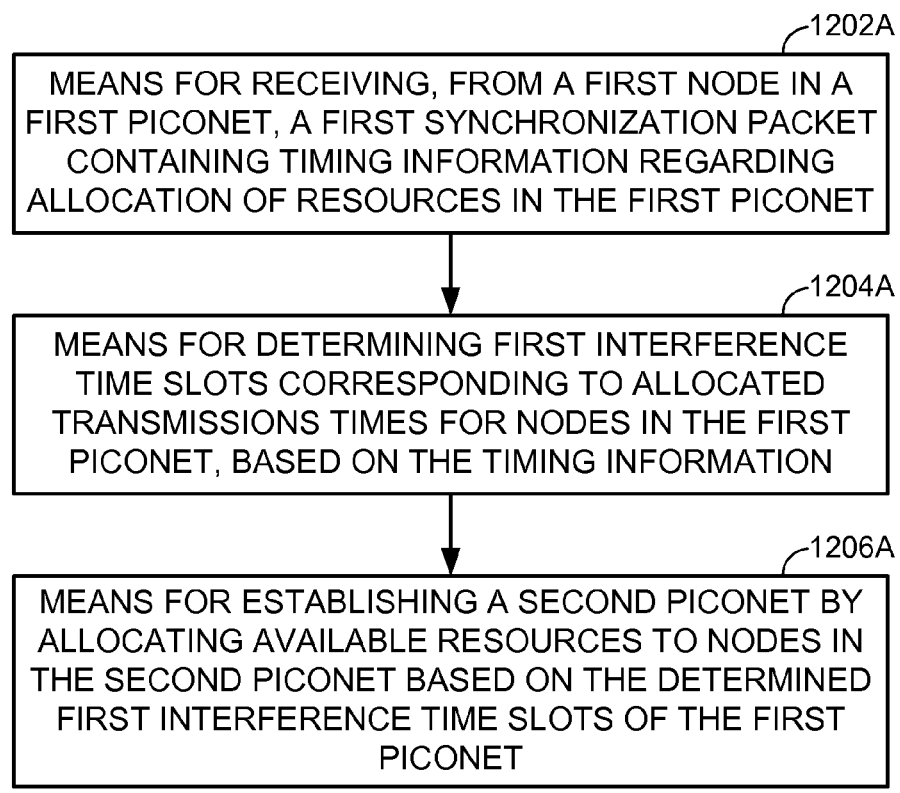
FIG. 12A illustrates example components capable of performing the operations shown in FIG. 12.

The various operations of methods described above may be performed by any suitable means capable of performing the corresponding functions. The means may include various hardware and/or software component(s) and/or module(s), including, but not limited to a circuit, an application specific integrate circuit (ASIC), or processor. For example, "ranging logic" for performing ranging operations, and "adjusting logic" for adjusting a bandwidth and/or resolution of a wirelessly distributed video, may be performed by various components that make up a wireless device or terminal. Some potential components of a terminal, as discussed in the specification, include a baseband processor, a microprocessor, a digital signal processor, a signal processor, a controller and a scheduler. Generally, where there are operations illustrated in Figures, those operations may have corresponding counterpart means-plus-function components with similar numbering. For example, blocks 510-530, 610-640, 1202-1206, and 1502-1504 illustrated in FIGS. 5, 6, and 12 correspond to circuit blocks 510A-530A, 610A-640A, 1202A-1206A, and 1502A-1504A illustrated in FIGS. 5A, 6A, and 12A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term "at least one of a or b" is intended to be inclusive. In other words, "at least one of A or B" includes the following sets {A}, {B}, and {A and B}.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure, and recited in the claims below, may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication performed by an apparatus, comprising:
    performing ranging operations for a destination node that is to receive wirelessly distributed video to determine proximity between a wireless video source and the destination node; and
    adjusting at least one of a bandwidth or resolution of the wirelessly distributed video based on the determined proximity,
    wherein the ranging operations include the steps of:
        receiving, from the destination node, a synchronization packet containing a time stamp indicating a transmission time of the synchronization packet; and
        calculating a result based on a difference between a time when the synchronization packet was received and a time indicated by the time stamp.

2. The method of claim 1, wherein the adjusting comprises:
    increasing the resolution of the wirelessly distributed video if the results of the ranging operations indicate the wireless video source and the destination node are in relatively close proximity to each other.

3. The method of claim 1, wherein the adjusting comprises:
    decreasing the resolution of the wirelessly distributed video if the results of the ranging operations indicate the wireless video source and the destination node are not in relatively close proximity to each other.

4. An apparatus for wireless communication, comprising:
    ranging logic configured to perform ranging operations for a destination node that is to receive wirelessly distributed video to determine proximity between a wireless video source and the destination node; and
    adjusting logic configured to adjust at least one of a bandwidth or resolution of the wirelessly distributed video based on the determined proximity,
    wherein the ranging logic receives, from the destination node, a synchronization packet containing a time stamp indicating a transmission time of the synchronization packet, and calculates a result based on a difference between a time when the synchronization packet was received and a time indicated by the time stamp.

5. The apparatus of claim 4, wherein the adjusting logic is configured to:
    increase the resolution of the wirelessly distributed video if the results of the ranging operations indicate the wireless video source and the destination node are in relatively close proximity to each other.

6. The apparatus of claim 4, wherein the adjusting logic is configured to:
    decrease the resolution of the wirelessly distributed video if the results of the ranging operations indicate the wireless video source and the destination node are not in relatively close proximity to each other.

7. An apparatus for wireless communication, comprising:
    means for performing ranging operations for a destination node that is to receive wirelessly distributed video to determine proximity between a wireless video source and the destination node; and
    means for adjusting at least one of a bandwidth or resolution of the wirelessly distributed video based on the determined proximity, wherein the means for performing ranging operations is configured to:
   receive, from the destination node, a synchronization packet containing a time stamp indicating a transmission time of the synchronization packet; and
   calculate a result based on a difference between a time when the synchronization packet was received and a time indicated by the time stamp.

8. The apparatus of claim 7, wherein the means for performing ranging operations is configured to:
   increase the resolution of the wirelessly distributed video if the results of the ranging operations indicate the wireless video source and the destination node are in relatively close proximity to each other.

9. The apparatus of claim 7, wherein the means for adjusting is configured to:
   decrease the resolution of the wirelessly distributed video if the results of the ranging operations indicate the wireless video source and the destination node are not in relatively close proximity to each other.

10. A wireless video source, comprising:
   at least one antenna;
   ranging logic configured to perform ranging operations, based on packets received via the at least one antenna, for a destination node that is to receive wirelessly distributed video to determine proximity between the wireless video source and the destination node; and
   adjusting logic configured to adjust at least one of a bandwidth or resolution of the wirelessly distributed video based on the determined proximity,
   wherein the means for performing ranging operations is configured to:
      receive, from the destination node, a synchronization packet containing a time stamp indicating a transmission time of the synchronization packet; and
      calculate a result based on a difference between a time when the synchronization packet was received and a time indicated by the time stamp.

11. A computer-program product for wireless communications, comprising a non-transitory computer-readable medium comprising instructions executable to:
   perform ranging operations for a destination node that is to receive wirelessly distributed video to determine proximity between a wireless video source and the destination node; and
   adjust at least one of a bandwidth or resolution of the wirelessly distributed video based on the determined proximity, and
   wherein the ranging operations further include instructions to:
      receive, from the destination node, a synchronization packet containing a time stamp indicating a transmission time of the synchronization packet; and
      calculate a result based on a difference between a time when the synchronization packet was received and a time indicated by the time stamp.

\* \* \* \* \*